Patented Apr. 30, 1935

1,999,315

UNITED STATES PATENT OFFICE 1,999,315

PRODUCTION OF ETHERS

Alfred William Baldwin and Alfred Davidson, Blackley, Manchester, England, assignors to Imperial Chemical Industries Limited, a corporation of Great Britain No Drawing. Application November 28, 1932, Serial No. 644,746. In Great Britain December 2, 1931

10 Claims. (Cl. 260—149)

This invention relates to ethers, more particularly to aliphatic and alphyl ethers, and a process for the production thereof.

It is known that ethers may be produced by reacting an aliphatic alcohol, such as, for example, dodecyl alcohol, with sodamid and refluxing the resultant product with an aliphatic halide. A process of this character is attended by the disadvantage that it involves the use of sodamid, which is difficult and very often hazardous to handle.

It is an object of the present invention to provide a new and improved process for producing ethers which avoids the disadvantages and hazards of the sodamid process. A further object is the provision of a new and improved process for producing aliphatic and alphyl ethers. Another object is the production of new ethers which are especially valuable for use in the manufacture of products characterized by wetting, detergent and dispersing properties. A still further object is the production of new aliphatic-alphyl ethers. A still further object is to produce products which are useful as wetting, detergent and dispersing agents. Other objects will appear hereinafter.

These objects are accomplished according to the broader aspects of the invention whereby ethers are produced by reacting together an alcohol and an aliphatic or alphyl halide in the presence of aluminum and an acid binding agent. The products containing aliphatic radicals having ten or more carbon atoms, when treated with sulfating or sulfonating agents, are characterized by good wetting, penetrating, dispersing and detergent power.

While the invention is susceptible of considerable variation and modification in the manner of its practical application, particularly as regards the proportions of materials, conditions of reaction, and the exact method of procedure, the following examples, in which the parts are by weight, will illustrate some of the products falling within the invention and how they may be prepared.

Example I

A mixture comprising substantially 54 parts of octadecyl alcohol, 14 parts of chalk, 34 parts of benzyl chloride, and 1 part of aluminum powder was heated with stirring in a vessel provided with a reflux condenser at a temperature of about 190° C. to about 200° C. for a period of about 6 to 8 hours. The mixture was cooled and stirred with 100 parts of benzene to facilitate manipulation. It was then filtered free from unchanged aluminum and inorganic salts. The benzene and other volatile matter was removed from the filtrate by evaporation (if desired, the evaporation may be made under sub-atmospheric pressure). Approximately 69 parts of a product which was mainly octadecyl benzyl ether, together with a small proportion of unchanged alcohol, was obtained. This product may be used as such or, if desired, may be purified by washing with hot methyl alcohol, in which the octadecyl alcohol dissolves. The purified ether has a boiling point of about 250° C. at 15 mm. pressure.

The resultant product may be treated with a sulfating or sulfonating agent, such as, for example, sulfuric acid monohydrate, at a temperature of about 20° C. to 25° C. to produce a product characterized by excellent wetting, detergent and dispersing properties.

Example II

A mixture of 48.4 parts of cetyl alcohol, 6 parts of magnesia (or 14 parts of chalk), 34 parts of benzyl chloride, and about 1 part of aluminum powder was reacted together at a temperature of about 190° C. to 200° C. for a period of about 6 to 8 hours, and the product recovered as described in Example I. The product obtained, comprising substantially cetyl benzyl-ether had a boiling point of about 230° C. to 256° C. at 15 mm. pressure.

Example III

About 37.2 parts of dodecyl alcohol, 14 parts of chalk, 34 parts of benzyl chloride, and 1 part of aluminum powder were reacted together and the product recovered as described in Example I. The resultant product, comprising substantially dodecyl benzyl-ether, had a boiling point of about 190° C. to 202° C. at 11 mm. pressure.

Example IV

A mixture of 53.6 parts of oleyl (octadecenyl) alcohol 14 parts of chalk, 34 parts of benzyl chloride, and 1 part of aluminum powder was heated together at a temperature of about 190° C. to 200° C. for about 8 hours. The mixture was then cooled and stirred with 100 parts of benzene. It was then filtered free from unchanged aluminum and inorganic salts, and the benzene and other volatile matter removed from the filtrate by evaporation under diminished pressure. Oleyl benzyl-ether was obtained as a colorless oil of high boiling point, which tended to undergo decomposition when heated. This product, when treated with chloro-sulfonic acid, yielded a good detergent. Aqueous solutions of the sulfonated or sulfated product were good cleansing media for textile materials.

It will be understood that the invention is not limited by the examples. Insofar as is known, the procedure described is generally applicable to the production of ethers by the elimination of a halogen halide between the hydrogen of the hydroxyl group of an alcohol and a halogen of an acyclic carbon atom.

As specific examples of alcohols which may be reacted with aliphatic or alphyl halides in accordance with the invention may be mentioned: methyl, ethyl, propyl, isopropyl, butyl, isobutyl, amyl, allyl, mixtures of alcohols, for example, such as may be obtained by the hydrogenation of carbon oxides, benzyl alcohol, cyclo-hexanol, cyclo-pentanol, hydroxyethyl benzene, and higher alcohols of the aliphatic series either saturated or unsaturated, as for example, geraniol, linalool, citronellol, decyl, undecyl, dodecyl (lauryl), tridecyl, tetradecyl (myristyl), pentadecyl, octadecyl, ricinoleyl, oleyl, eicosyl, erucyl, ceryl, carnaubyl, melissyl, palmityl, myricyl, undecelenyl alcohols and mixtures of higher alcohols such as may be obtained by the hydrogenation of cocoanut oil or other fatty oils.

As specific examples of halides which may be reacted with the foregoing alcohols may be mentioned: aliphatic halides, such as, for example, ethyl chloride, ethyl bromide, ethyl iodide, ethylene chloride, ethylene bromide, isopropyl bromide, allyl bromide and higher members of the aliphatic series, e. g., lauryl bromide, cetyl iodide, oleyl bromide and the like; alphyl halides, i. e., aryl-alkyl compounds containing halogen atoms on the alkyl group, as for example, benzyl chloride, benzyl bromide, chloro-ethyl benzene, chloro-methyl toluene, alpha-chloromethyl naphthalene, chloromethyl-chloro-benzene and the like.

The temperature employed in the reaction between the alcohol and the halide may vary within relatively wide limits depending largely upon the specific reactants. The temperature should preferably be sufficiently high to allow the reaction to proceed smoothly but insufficiently high to cause the formation of decomposition products. In general, temperatures in the neighborhood of about 190° C. to 200° C. have given desirable results, but higher or lower temperatures may be used.

The pressure may be atmospheric, sub-atmospheric or super-atmospheric. If relatively low-boiling alcohols are used, the reaction may be carried out in a closed vessel under super-atmospheric pressure in order to maintain the desired temperature. Where ethers are produced from relatively high boiling alcohols and halides, as for example, higher aliphatic alcohols and benzyl halides, the reaction may be conducted in a vessel fitted with a stirrer and reflux condenser. In this case, the temperature may conveniently be the boiling point or somewhat above the boiling point of the lower boiling reactant. If desired, active boiling may be maintained.

The acid binding agent may conveniently be any substance capable of removing the hydrogen halide from the reaction zone without adverse effect on the reaction. In general, it is preferable to employ a neutral or weakly alkaline acid binding agent, as for example, magnesium oxide, calcium carbonate, sodium carbonate, sodium bicarbonate, potassium carbonate and the like.

As previously indicated, it has been found that the ethers containing an aliphatic radical having ten or more carbon atoms may be treated with sulfating or sulfonating agents to produce products which are especially valuable for use as wetting, dispersing, or detergent agents. The ethers having the general formula

in which R is an aliphatic radical containing at least ten carbon atoms, and R' is an alphyl radical, are particularly advantageous from this standpoint, yielding, when treated with sulfating or sulfonating agents, products of excellent cleaning, wetting, and penetrating power.

The sulfonation or sulfation may be conducted in any suitable manner, preferably under such conditions of temperature and pressure as to avoid the formation of substantial amounts of decomposition products. In general, it is preferable to employ relatively low temperatures, e. g., about 20° C. to 35° C. The ether to be sulfonated may have admixed therewith other substances such as higher aliphatic alcohols. If desired, the sulfonation or sulfation may be carried out in an inert liquid medium, such as, for example, carbon tetrachloride or sulfur dioxide.

The properties of the sulfated or sulfonated product may vary considerably depending upon various factors such as temperature, the kind and amount of sulfonating agent, and the type of compound treated. In general, the ethers preferably subjected to the sulfation or sulfonation treatment are those containing primary normal alkyl radicals having at least ten carbon atoms, either saturated or unsaturated. Of the compounds of this type containing unsaturated aliphatic radicals, it is preferable that the double bonds be at (i. e., between the alpha-beta carbon atoms) or near the end of the chain.

The sulfating or sulfonating agent may be a substance such as is ordinarily used for this purpose, for example, concentrated sulfuric acid, chloro-sulfonic acid, oleum, sulfur trioxide, and the like. It may be desirable, particularly in the treatment of ethers containing unsaturated aliphatic radicals, to effect the sulfation or sulfonation with a sulfating or sulfonating agent and a compound capable of forming an addition product therewith, as for example, acetic acid, acetic anhydride, dialkyl aryl amines (e. g., dimethyl aniline, diethyl aniline, etc.), other tertiary amines (e. g., pyridine, quinoline, piccoline, trimethyl amine, triethyl amines), and secondary amines such as alkyl-o-toluidines (e. g., methyl-o-toluidine, ethyl-o-toluidine).

The amount of sulfonating or sulfating agent may vary widely. If desired, less than one mole of sulfonating agent per mole of ether may be used, thereby yielding a product containing some unsulfonated raw material. In general, however, it is preferable to employ at least equimolecular proportions and preferably an excess of the sulfonating agent.

The resultant products which may be in the form of sulfo-acids or salts thereof possess remarkable soap-like properties, are stable to acids and may be used in calcareous or other hard water. Furthermore, they are not decomposed by the usual hydrolytic agencies. On account of their excellent detergent, wetting and dispersive properties, the various products containing sulfonic or sulfate groups have a wide application. They may be used as such or with a wide variety of additional materials and are particularly useful for addition to liquids for cleansing, scouring or otherwise treating fibrous materials such as textiles and leather.

The advantages of the present invention will be apparent. It provides a method of producing ethers by a process involving none of the dangers of the old sodamid process. Insofar as is known, the ethers having the general formula

in which R is an unsaturated aliphatic radical containing ten or more carbon atoms and R' is an alphyl radical are new compounds.

As many apparently widely different embodiments of this invention may be made without departing from the spirit and scope thereof, it is to be understood that we do not limit ourselves to the specific embodiments thereof except as defined in the following claims.

We claim:

1. In the production of ethers, the step which comprises reacting together an alcohol and a halide selected from the group consisting of aliphatic and alphyl halides in the presence of aluminum and an acid-binding agent.

2. In the production of ethers, the step which comprises reacting together an alkyl alcohol and an alphyl halide in the presence of finely divided aluminum and an acid-binding agent.

3. A process for the manufacture of aralkyl ethers of alcohols containing more than ten carbon atoms wherein the said alcohols, an aralkyl chloride, and finely divided aluminum are caused to interact in the presence of an acid-binding agent.

4. The process of producing dodecyl benzyl ether which comprises reacting together about 37.2 parts of dodecyl alcohol, 14 parts of calcium carbonate, 34 parts of benzyl chloride and about 1 part of aluminum powder at a temperature of about 190° C. to about 200° C., cooling the mixture and stirring it with about 100 parts of benzene, separating the solids present, and recovering the dodecyl benzyl ether by evaporation of the benzene.

5. In the production of ethers especially useful as wetting, dispersing and detergent agents, the process which comprises reacting together an aliphatic alcohol containing at least ten carbon atoms and a halide selected from the group consisting of aliphatic and alphyl halides in the presence of finely divided aluminum and an acid-binding agent, and treating the resultant ether with a sulfonating agent.

6. Ethers having the general formula

wherein R is an unsaturated aliphatic radical containing at least ten carbon atoms and R' is an alphyl radical.

7. In the production of ethers especially useful as wetting, dispersing and detergent agents, the process which comprises reacting together an aliphatic alcohol containing at least ten carbon atoms and an alphyl halide, in the presence of finely divided aluminum and an acid-binding agent, and treating the resultant ether with a sulfonating agent.

8. Sulfonated ethers obtainable by treating ethers having the general formula R—O—R', wherein R is an unsaturated aliphatic radical containing at least ten carbon atoms and R' is an alphyl radical, with a sulfonating agent.

9. Oleyl benzyl ether.

10. Sulfonated oleyl benzyl ether obtainable by treating oleyl benzyl ether with a sulfonating agent.

ALFRED WILLIAM BALDWIN.
ALFRED DAVIDSON.